No. 801,350. PATENTED OCT. 10, 1905.
T. B. WILLIAMS.
VALVE RESEATING MACHINE.
APPLICATION FILED APR. 25, 1904.

Witnesses:

Inventor,
Thomas B. Williams
by
Attorneys

No. 801,350. PATENTED OCT. 10, 1905.
T. B. WILLIAMS.
VALVE RESEATING MACHINE.
APPLICATION FILED APR. 25, 1904.

UNITED STATES PATENT OFFICE.

THOMAS B. WILLIAMS, OF ORANGE, MASSACHUSETTS, ASSIGNOR TO THE LEAVITT MACHINE COMPANY, OF ORANGE, MASSACHUSETTS, A CORPORATION.

VALVE-RESEATING MACHINE.

No. 801,350.      Specification of Letters Patent.      Patented Oct. 10, 1905.

Application filed April 25, 1904. Serial No. 204,805.

*To all whom it may concern:*

Be it known that I, THOMAS B. WILLIAMS, a citizen of the United States of America, residing at Orange, in the county of Franklin and State of Massachusetts, have invented new and useful Improvements in Valve-Reseating Machines, of which the following is a specification.

This invention relates to valve-reseating devices, and has special reference to mechanism adapted to the reseating of large valves which cannot conveniently be removed from their location in a pipe-line and in which, therefore, the facing off of the seats of the valve in the body and the side of the plug or gate must be effected in separate operations and in different places.

The object of the invention is, first, to provide a valve-reseating mechanism which may be adjusted to be used interchangeably to face off the seat of the valve and to face off the plug or gate at the same angle, whereby an accurate fit of the plug in the valve-body may be assured, and, second, specific objects of the invention are to provide a cutting-tool adapted for use in machines of this class which is arranged to face off the seats and the plug as the same would be done in a lathe—viz., by the provision of a rotating tool having feeding devices to feed the tool radially of its axis of rotation, to provide a tool of this description capable of radial adjustments independently of or auxiliary to its radial feed movement, whereby it may be adapted to face off annular valve-seats of different diameters.

Still further objects of the invention are to improve the construction in matters pertaining to certain novel features, which will be described further on in this specification, all of which will be particularly pointed out in the claims appended thereto.

Referring to the drawings forming part of this application, Fig. 3 is an end view, partly in section, of the machine in the position shown in Fig. 2, the section being in the plane of line 3 3, Fig. 2. Fig. $3^a$ is a sectional view of the upper part of Fig. 3 on the line $3^a\ 3^a$. Fig. $3^b$ is a sectional view on line $3^b\ 3^b$, Fig. 3.

This invention is characterized by two features which are believed to be broadly new in this art. The first is the method of and the provision of mechanism for facing off the seats of the valve within the body, and the use of the same mechanism outside of the valve-body to face off the plug or gate of the valve without disturbing the adjustment of the cutting mechanism, a common base for both of these operations being provided, this base consisting of a bed-plate carrying the reseating mechanism, which plate and mechanism may be transferred bodily from an operative position relative to the valve-body to a like position relative to the gate of the valve, which may be supported by means of suitable clamps in a frame apart from the valve-body. This new method, while necessarily disclosed in this application in the description of the mechanisms whereby it is put into practice, forms the subject of another application. The second feature referred to is the rotatable head on which a cutting-tool is mounted, which by the rotation of the head has imparted thereto a feed movement which is radial to the axis of rotation of the head, whereby the annular seats with which all large gate-valves are provided may be turned off, as would be done in a lathe, by beginning at one edge of the seat and taking off a chip in a circular path on the face thereof, gradually working toward the other edge, the feed movement being preferably from the center of the head outward. This construction takes the place of a cutter-head having radial arms in which cutting-tools are supported which cover practically the entire surface of the seat or plug to be faced off, which head is supported rotatably on a universal joint at its axis and seats itself against the surface to be finished off. Reseating devices provided with cutting-tools of this character have been found to be ineffectual when used on large valves—that is to say, above four or five inches in diameter—first, because they are not accurate, and, second, because it is difficult to provide a sufficiently powerful driving mechanism to operate them economically or practically when the seats of the valve-body have to be faced off without removing the body from its position in the pipeline. Where the valve-reseating mechanism is thus adapted to operate to face off the seats of the valve-body in one place and is then removed to another place where it is used to face off the faces of the valve gate or plug, it is essential for accuracy that a true base-line should be provided upon which the reseating devices may be located in either of these positions to the end that when these devices are adjusted to cut a seat located at a certain angle to this base-line when they are removed to another place and used without change of adjustment to face off the plug it is self-evident that the angle of the plug and the valve-seat against which it bears when in the valve-body will be in the same plane relative to the base-line. Bearing these points in mind and assuming the valve-body to be rigidly supported in one place, as in its operative position in the pipe-line, and assuming the plug of the valve to be removed therefrom and rigidly supported in suitable clamping devices in relatively the same plane it would occupy in the valve-body, the valve-reseating mechanism would first be applied to the valve-body and adjusted to the proper angle to face off the seat therein, after which operation it would be transferred to a suitable frame in which the valve-plug would be rigidly supported, and that face of the plug which would bear against the valve-seat just faced off would then be faced off at the same angle, whereupon the operation would be repeated for the opposite seat of the valve and that face of the plug bearing thereagainst. By this method of procedure practically perfect parallelism of the faces of the valve-plug and its seats is assured.

Figure 1:
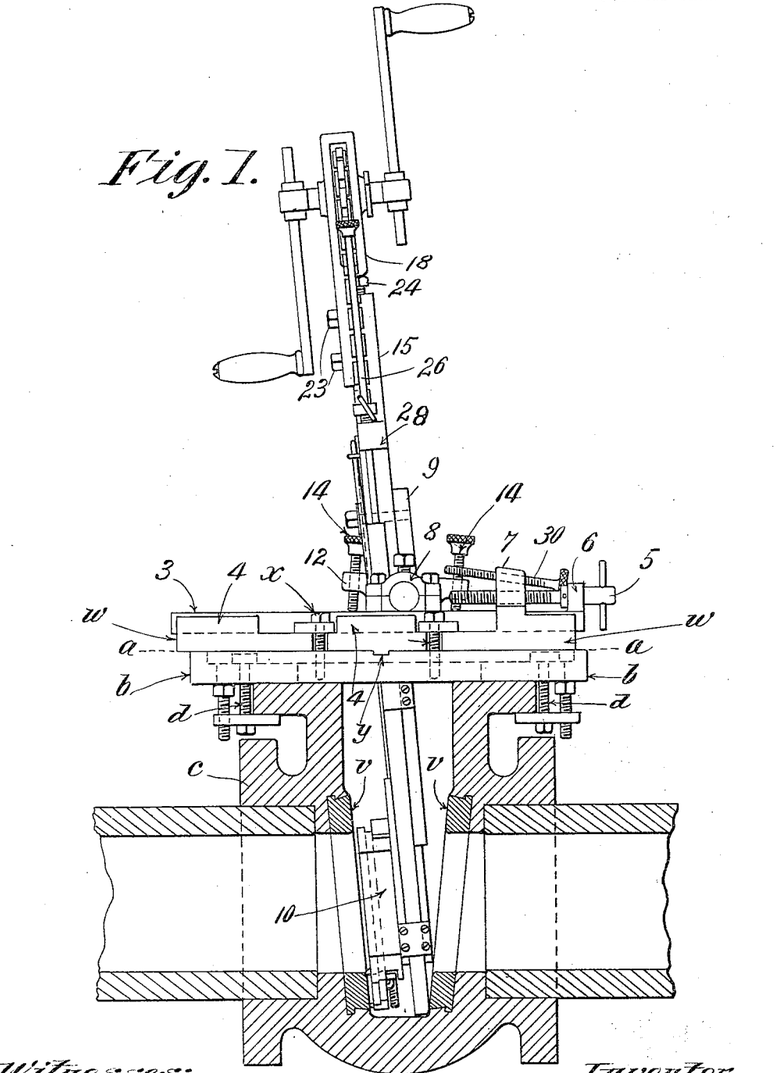
Figure 1 is a side elevation of the valve-reseating mechanism as applied to a valve-body, the latter and the pipes with which it is connected being shown in section.
Figure 2:
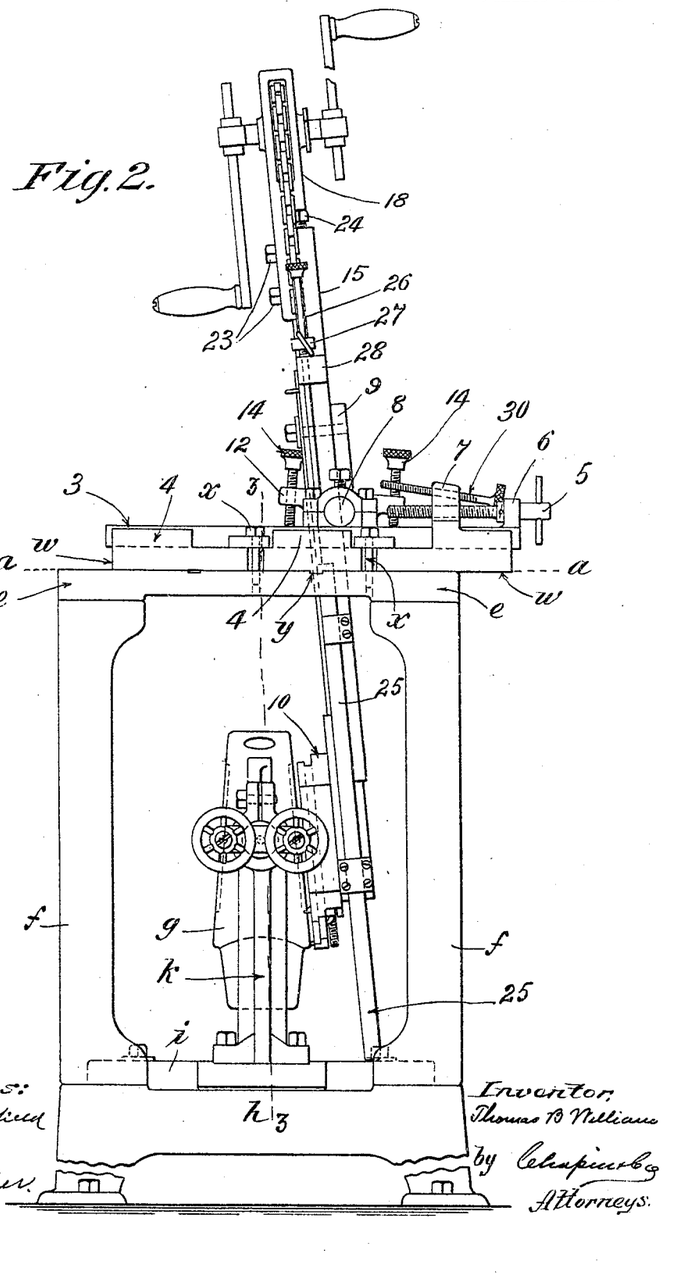
Fig. 2 is a like view of the reseating mechanism as applied to the plug or gate of the valve removed from the valve-body.
Figures 3, 3A, 3B:
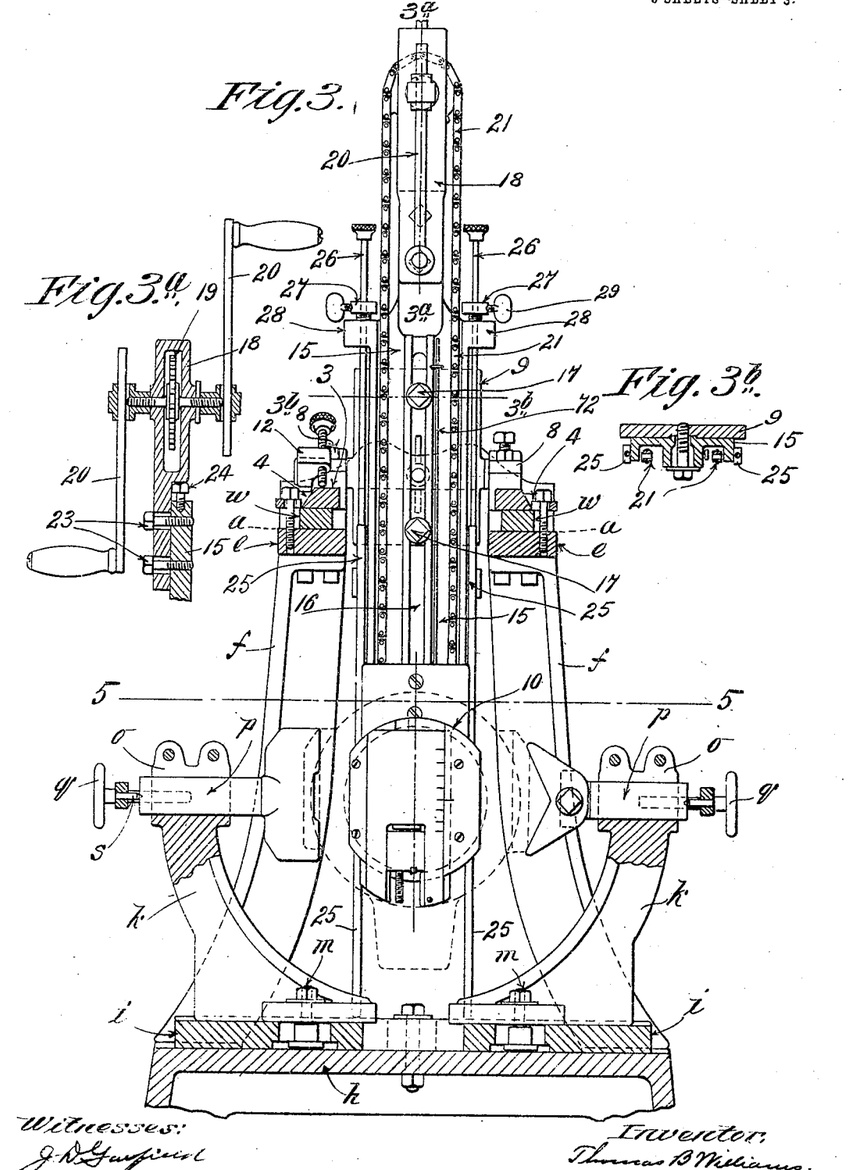
Figure 5:
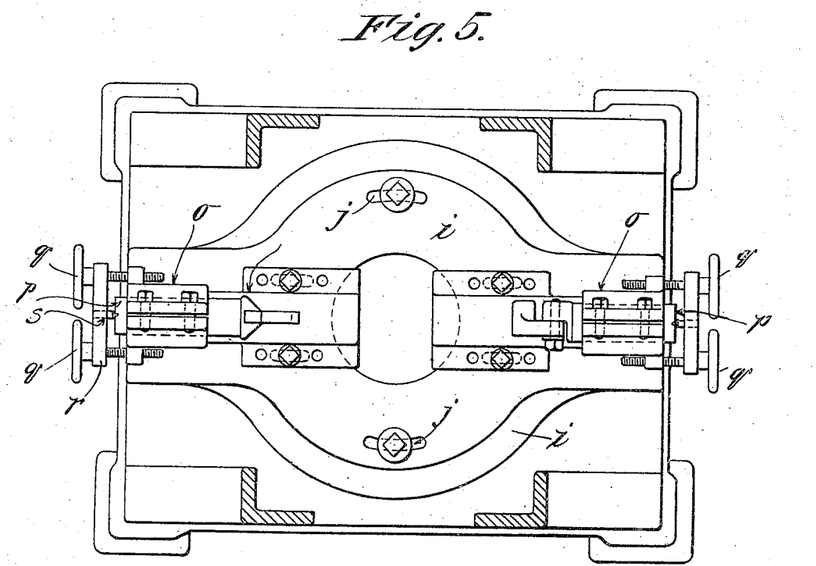
Fig. 5 is a sectional plan view of a gate-clamping device, the section being taken on line 5 5, Fig. 3.

Referring now to the drawings, the common base-line for the valve-body and the plug, respectively, is indicated by $a$ in Fig. 1 for the valve-body and by the same letter of reference in Figs. 2 and 3 for the valve-plug. For the valve-body it is thus provided by bolting a base-plate $b$ to the upper surface of a valve-body $c$, from which the bonnet has been removed. This base-plate may be made of any suitable form to fit bodies of different valves and be provided with any manner of devices for securing the plate to the body. In the drawings the bolts $d$ have this function. The surfaces of this base-plate $b$ are planed off true, and of course the top of the valve is squared off true also, and when in position thereon the base-plate $b$ occupies the same relation relative to the valve-body that the horizontal bed $e$ on the uprights $f$ of the frame (shown in Fig. 2) bears to the valve plug or gate $g$, supported therein. These uprights $f$ extend upwardly from the base $h$ of the frame, on which there is mounted a horizontally-rotatable plate $i$, provided with concentric slots $j$ and bolts therein, whereby it may be rotated about its vertical axis. Oppositely located on this plate are two bracket-arms $k$, adjustable thereon radially by means of the bolts $m$, these bracket-arms sliding on ways located on the top of the plate, whereby their alinement one with the other is maintained. In the upper end of each of the arms $k$ is a split bearing $o$ for the clamping-dogs, provided with cylindrical stems $p$, which are slidable in their bearings, suitable means to effect the adjustment of these dogs being provided, as shown in Fig. 5, which consists in mounting a couple of adjusting-screws $q$ in lugs on each side of the bearing and engaging a cross-head $r$, in which is located a stud $s$, which bears centrally against the end of the stems $p$ of said dogs. Thus after the arms $k$ have been adjusted the plug may be clamped in the hereinbefore-described devices in the position shown in dotted lines in Fig. 3 and in full lines in Fig. 2, which is substantially the position as regards the plane of its faces which it would occupy in the valve-body, with the exception that it is reversed, this position being adopted for convenience sake only, as nearly all of these plugs are tapered and it is more convenient to adjust the cutting-tool thereto in the position shown than if the thicker end of the plug were uppermost.

Clamping devices other than those shown and described herein may be adopted, if desired, this construction, however, being a desirable one, as it permits the rotation of the plug on a vertical axis after it is clamped and also permits the swinging thereof on the axes of the stems $p$ of the clamping-dogs and by means of the adjusting-screws $q$ permits also of transverse adjustments in the line of the axis of the stems $p$. When all of these adjustments have been effected, the bolts through the split bearings $o$ may be turned up, and the valve-plug will be immovably held in proper position to have its faces dressed off in the manner to be hereinafter described. The plugs $g$ on all large gate-valves are provided with guide-grooves on each edge thereof, extending vertically of the gate, and the clamping-dogs are made to fit these grooves to more securely clamp the plug.

Figure 4:
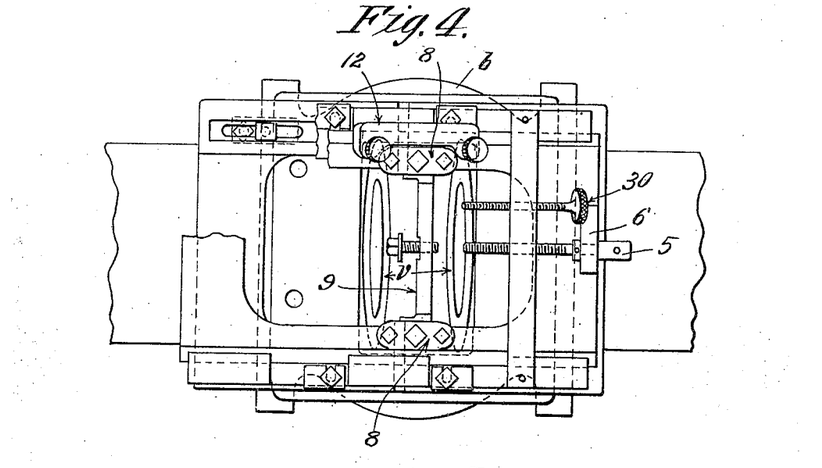
Fig. 4 is a plan view of the base-plate and bed-plate as secured to the top of the valve-body in Fig. 1, the cutting-tool and its operating means being removed and the corner of the bed-plate being broken away.

I now come to the description of the mechanism whereby the faces of the seats of the valve and corresponding faces of the plug are dressed off. The seats are lettered $v$ and are shown only in Figs. 1 and 4. They are of the usual type and constructed in the usual manner. In this case they are shown as annular members made separately from the body of the valve and the latter cast onto them. Their form or the manner of their construction is immaterial, however. As shown herein, both of these seats are inclined at the same angle to the vertical. This also is immaterial, as in some cases these valves are made with only the inclined seat, and whichever of the two constructions is adopted the reseating devices may be used thereon with equal advantage, which would be the case also were the two seats in parallel planes. These reseating devices consist in a bed-plate $w$, which when the devices are operating on a plug is mounted on the bed $e$ and when the devices are operating on the valve-seat is mounted on the base-plate $b$. In either case it is fixedly secured either to the bed $e$ or the base-plate $b$ by means of bolts $x$. As shown in Figs. 1, 2, and 3, the base-plate $b$ and bed $e$ and the bed-plate $w$ have rectangular openings therein, through which the arm extends on which the rotating cutter-head is supported. On the bed-plate $w$ is a transversely-located rib $y$, fitting into a similarly-located groove in the plate $b$, whereby when the bed-plate $w$ is removed and then replaced thereon it may always occupy the same position relative to the longitudinal center line of the base-plate. In the bed $e$ two grooves are cut transversely thereof for the reception of this rib $y$ and are so located each side of the vertical center line of the machine, as seen in Fig. 2, as to locate the reseating devices carried on the bed-plate $w$ approximately in operative position relative to either side of the valve-gate $g$, this bed-plate and the reseating devices being located on the bed $e$, according as it is to be used to face off either one side or the other of the plug, it being lifted out of the frame and turned end for end in making the change. On the bed-plate $w$ is a sliding plate 3, movable longitudinally in the gibs 4 by means of a feed-screw 5, rotatably mounted in an upstanding lug 6 and having a screw-threaded engagement with a rib 7, which extends from one edge of the plate $w$, over the sliding plate 3, to the opposite edge. On each side of the plate 3 and close to the edge of the opening therethrough are two bearings 8, (see Fig. 4,) which receive the trunnions of a vertically-disposed plate 9, which extends through the openings in the bed $e$, the bed-plate $w$, and the sliding plate 3, which plate serves as a support for the cutter-head, which as a whole may be indicated by 10 in the general views.

On this plate the driving mechanism for this head is also supported, together with certain other parts thereof, which will be duly described in their proper place. This plate 9 is capable of swinging movements on its trunnions in the bearings 8, whereby the face of the cutter-head 10 may be brought into parallelism with one of the inclined faces of the valve-plug $g$, and this swinging movement is effected by means of a cross-head 12, extending transversely of one of the trunnions and whose position is clearly indicated in Fig. 4. Through the ends of this cross-head 12 extend the two screws 14, their ends bearing on the upper surface of the plate 3. By turning these screws in and out any degree of inclination may be imparted to the devices mounted on the plate 9. Then by the manipulation of the feed-screw 5 the cutter-head 10 may be adjusted toward or from the face of the plug and bring it into proper relation thereto. On the plate 9 is another long narrow plate or arm 15, having a longitudinally-disposed central slot 16, through which the bolts 17 pass, whereby this long plate may be secured to the plate 9. This plate 15 is, in effect, a long rigid arm on which the cutter-head 10 is mounted and which is endwise adjustable on the plate 9. The upper end of this plate or arm has mounted thereon an endwise-adjustable extension-plate 18, the disposition of which relative to the end of the arm 15 is shown in Fig. 3$^a$ clearly. On this extension-plate there is mounted a sprocket-wheel 19, which is rotated by the crank-arms 20 and over which a drive-chain 21 extends to another sprocket-wheel back of the cutter-head 10 (shown in Figs. 6, 7, and 8 only) and which is numbered 22. This extensible portion 18 may be adjusted to keep the sprocket-chain 21 tight by loosening the bolts 23, whereby the extension is secured to the upper end of the arm 15 and then turning up the bolt 24 (shown in Figs. 2 and 3$^a$ as mounted in the upper end of the arm 15) and bears on a shoulder on said extension-plate 18. For the purpose of steadying the lower end of the arm 15 and to afford a proper support for the cutter-head this arm is provided with two sliding legs 25, one located on each side thereof, to the upper ends of which are fitted the round rods 26, which slide through the screw-threaded bushings 27, threaded into the bosses 28, which are cast on the side of the arm 15, as shown clearly in Fig. 3. After the cutter-head has been adjusted at the right angle in the manner described for the purpose of cutting the plug (shown in Fig. 2) or for the purpose of cutting the seat on a valve, as shown in Fig. 1, then these rods 26 are pushed down to bring the ends of the legs 25 to a bearing, after which the thumb-screws 29 in the screw-threaded bushing 27 are tightened up and the bushing then given, say, a half-turn, which operates to set the legs 25 down still more firmly. This or some similar expedient is desirable in order to hold the cutter-head rigidly during the operation of facing off a valve-seat or its plug, it being obvious that better work can be done under these conditions than without them. Attention is called to another novel feature in the construction of the plate 3 and the feeding devices therefor, which consists in providing the screw 30, located in proximity to the feed-screw 5, preferably in such position that the head thereof will, if the screw be turned out far enough, come in contact with the lug 6, to the end that if it is desired to back off the rotary head 10 away from its work before the latter is finished before doing so the screw 30 may be run out until its head bears against the lug 6, after which the tool may be backed off as much as desired, and when it is desired to recommence work on the unfinished piece the feed-screw 5 will be operated to move the slide toward the work until the lug 6 brings up against the end of the screw 30, which will insure the finishing of the work in the same plane as that in which it was begun.

Figure 6:
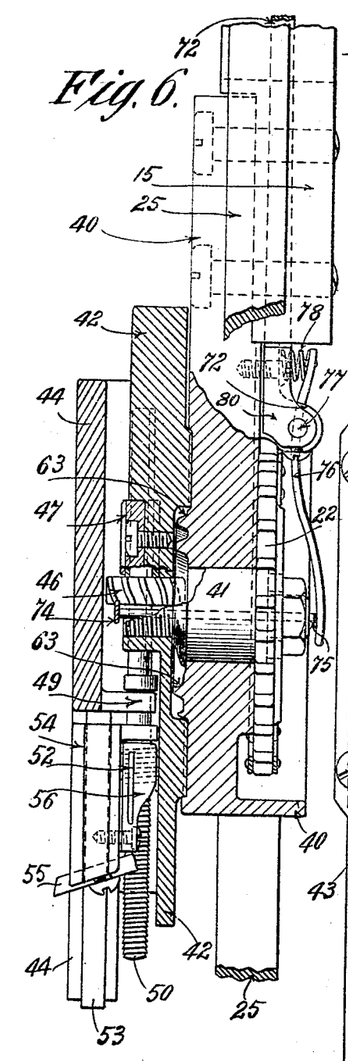
Fig. 6 is a sectional elevation of the rotating tool-carrying head, the arm on which it is supported being also shown partly in section.
Figure 7:
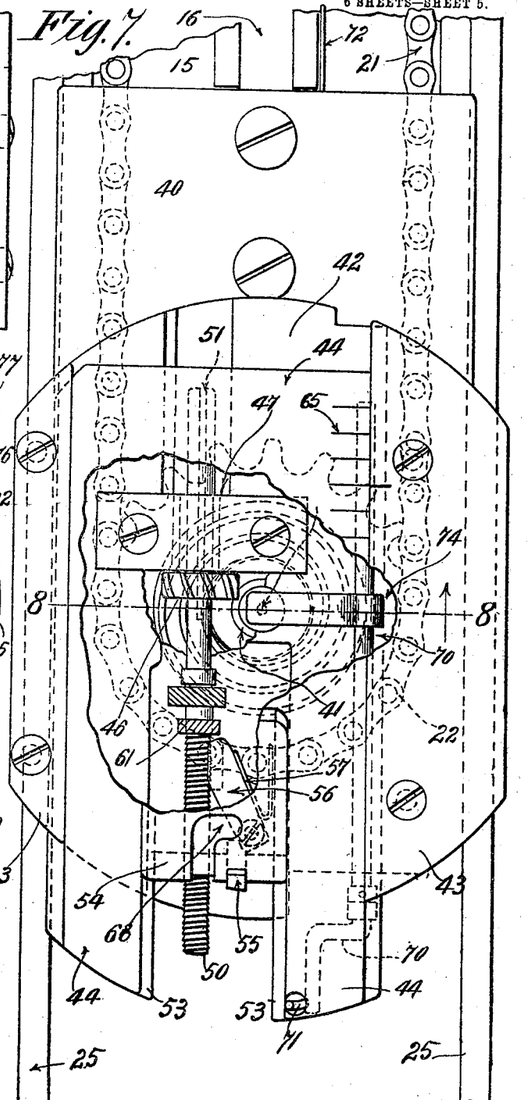
Fig. 7 is a face view of the rotating tool-carrying head and its support, certain parts thereof being broken away and certain parts being shown in section.
Figures 8, 9:
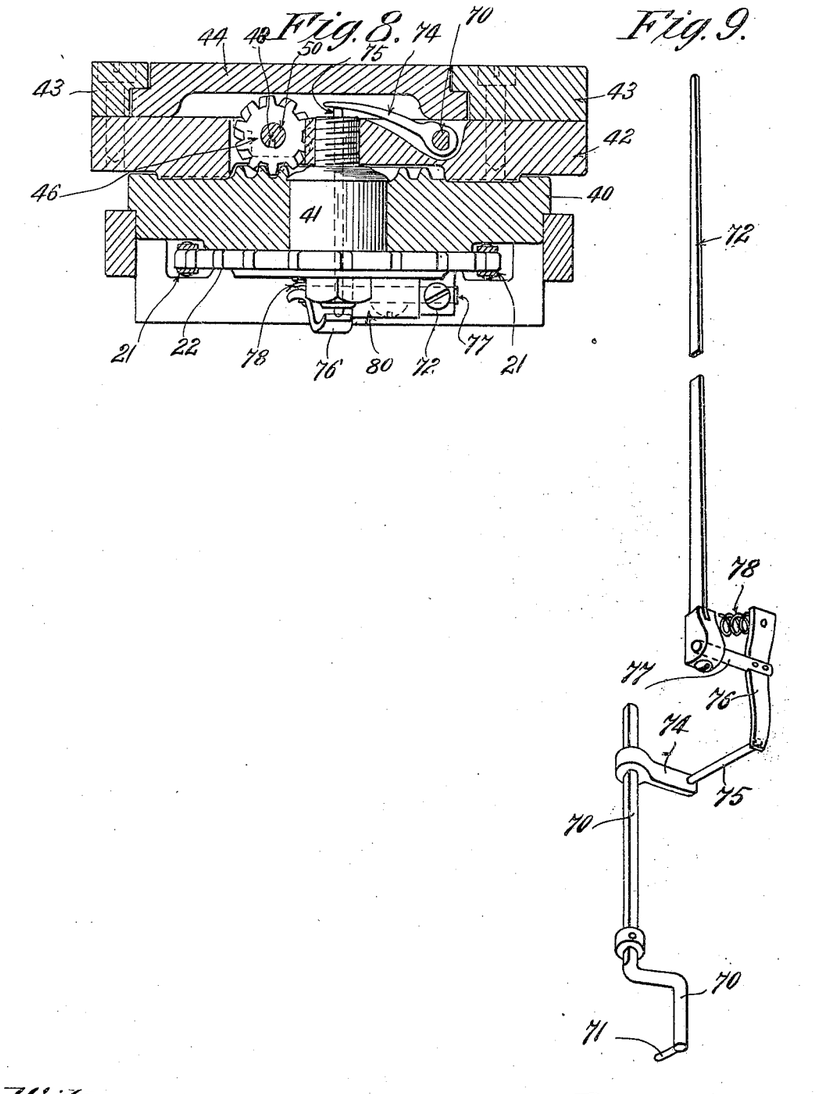
Fig. 8 is a sectional view of the rotating head and its support, the plane of the section being on line 8 8, Fig. 7.
Fig. 9 is a perspective view of a series of connected indicating-levers to facilitate the adjustment of the rotating tool-carrying head in a plane substantially parallel with that of a valve-seat or the face of a plug.

There remains to be described the rotatable cutter-head, which, as stated before, is rotated by means of the sprocket-chain 21, and reference must now be had to Figs. 6, 7, and 8 for the details of construction of this head, the device shown in Fig. 9 being described farther on. For convenience in manufacture the head is mounted on a separate plate 40, which is secured to the lower end of the plate 15, as shown in Figs. 6 and 7, in a somewhat offset position—that is to say, it is offset by about the thickness of the plate 15, (see Fig. 6,)—whereby the sprocket-wheel 22, mounted on the rear side of this plate 40, will be located substantially in the plane of the face of the plate 15 and in line with the sprocket-wheel 19 above. The sprocket-wheel 22 is secured to a stud 41, which extends through and is rotatable in the plate 40. The inner end of this stud is threaded, and there is screwed thereon a disk 42, which rotates with the sprocket-wheel, and between suitable gibs 43 there is mounted on the disk 42 a sliding carriage 44. As shown in section in Figs. 6 and 8, the disk 42 is cut away from a point near the center thereof to the periphery of the disk in line with the movements of the carriage 44, and in this depression in the disk near its axis is mounted a spiral pinion 46, which is rotatable within a bearing 47, but not endwise movable therein, the pinion being provided with a long hub extending into its bearing, in which is a feather 48. On the sliding carriage 44 is a lug 49, extending from the under side thereof toward the disk 42, in which is carried a feed-screw 50, the outer end of which is threaded and the inner end of which has a spline-groove (shown in dotted lines in Fig. 7 and numbered 51) which engages with the feather 48 in the hub of the pinion 46. From the lug 49 to the end of the sliding carriage that portion thereof under which the feed-screw 50 is located is cut away and has two parallel ways 53 formed on the edges of said cut-away portion, on which ways the tool-carriage 54 slides. This tool-carriage has secured in the forward edge thereof a tool 55, like a lathe-tool, and on the under side of the tool-carriage is a pawl 56, which by means of a spring 57 is yieldingly held against one side of the feed-screw 50. This feed-screw is of that character wherein one edge of the thread is vertical to its axis, the other being inclined, whereby the tool-carriage may be engaged, as by a hook, in the depression 60 and be pulled outward toward the end of the screw, the rotation of the screw serving to feed the carriage in the same direction. To retract the carriage, however, (which cannot be done by the reverse movement of the feed-screw, owing to the shape of the thread,) a tube or similar tool may be slipped over the outer end of the feed-screw and pushed along until it forces the pawl 56 away from the screw, whereupon the tool-carriage may be pushed inward as far as it is permitted to go—viz., about in the position shown in Fig. 7, where the end of the pawl is shown in close proximity to the end of a collar 61, fixed on the feed-screw.

On the plate 40 and disposed concentrically about the axis of the stud 41 is a horizontally-disposed screw-thread 63, with which the spiral teeth of the pinion 46 engage, and by reason of the rotative and sliding engagement of the feed-screw 50 with said pinion it is obvious that as the disk 42 is rotated the pinion 46 will be rotated in turn by its engagement with the thread 63, and this will impart rotative movements to the feed-screw, thus effecting the radial feeding movement of the tool-carriage 54 whatever may be the position of the carriage 44, the position of which may be varied relative to the axis of rotation of the disk 42 by loosening the gibs 43 and moving the slide radially, then tightening up the gibs. In this way the tool 55 may be adjusted to begin its cutting movement at the inner edge of the ring which constitutes the valve-seat and be fed across that ring to face it off as the tool is carried around in contact with the ring by the rotation of the head 10. This capability of adjustment limits the degree of feed movement obtainable from the screw 50 to the width of the annular valve-seat, the carriage 44 being adjusted in the manner described to locate the cutting-tool at the inner edge of the seat in the valve before the reseating devices are applied to the latter. To facilitate this adjustment of the carriage 44, a scale 65 (see Fig. 7) is applied to the carriage, to the end that the tool may be adjusted to operate on any known diameter of valve-seat before the reseating devices are located in the valve-body.

There is shown in Fig. 9 a device which, while not essential to the successful operation of the machine, is of great convenience in adjusting the face of the cutter-head to a position substantially parallel with the inclined face of the valve-seat or the valve-plug, and the mechanism consists in providing a crank-arm 70, which, as shown in Fig. 7, is located in a recess in the disk 42 in substantial parallelism with the feed-screw and in the forward end of which arm is a wire finger 71, extending through a hole in the face of the sliding carriage 44, (see Fig. 7,) adapted to bear against the face of the valve plug or seat, whereby if the cutter-head is rotated the bearing of said finger unequally on such surface will impart swinging movements to a long arm 72, extending up along the arm 15 adjacent to the centrally-disposed slot therein, movements being transmitted to said arm by mounting a crank-arm 74 slidably on the crank-arm 70, the arm 74 extending over the center of the stud 41, with which the disk 42 rotates, and bearing on a pin 75, loosely mounted in said stud and extending therethrough into contact with one end of an oscillating arm 76, supported on the back side of the plate 40 on a short shaft 77, on one end of which the lower end of said arm 72 is secured. The arm 76 extends beyond the shaft 77, and under this extended end of it is located a spring 78, which normally will press the end of the sliding crank-arm 74 away from the face of the disk 42, and consequently cause the wire finger 71 to extend beyond the face of the carriage 44. The manner in which this device is supported in the cutter-head may be readily traced by referring to Figs. 6, 7, and 8, Figs. 7 and 8 showing particularly in plan and in section the location of the crank-arm 70 under the right-hand edge of the carriage 44 and the sliding crank-arm 74 located in a pocket in the face of the disk 42, with its free end extending over the axis of the stud 41, and Fig. 8 showing the location of the arm 76 relative to the rear end of the pin 75 and showing also the hub of the arm 72. This view, as well as Fig. 6, shows the shaft 77, on which the arm 72 is secured, to be mounted in a bearing 80. From the foregoing description of this device it is clear that when the cutter-head has been adjusted to approximately the right angle relative to the face of the valve seat or plug the feed-screw 5 may be operated to move the plate 3 toward the surface to be operated upon until the finger 71 will touch that surface at some point when the cutter-head is rotated. This contact will cause the end of the arm 72 to swing away from the plate 15 more or less, and the arm 15 may then be still further adjusted until the cutter-head 10 can be rotated with the finger 71 in contact with the surface to be operated upon without producing any material movement of the indicator-arm 72. This will indicate approximate parallelism of the face of the cutter-head and the surface of the valve seat or plug. In effecting this adjustment of the cutter-head to the valve-seat it may be necessary to leave the plate $b$ loose on the top of the valve to permit it to be shifted as required until the correct position of the cutter-head is attained.

The operation of this machine is as follows: The bonnet is first removed from the valve-body in the pipe-line and the plug of the valve taken out. The base-plate $b$ is then located on the top of the valve and the bed-plate $w$ placed on this bed and secured thereto by the bolts $x$, the arm 15 and the mechanism carried thereon being in position on said plate $w$. Prior to mounting the plate $w$ on the bed $b$ in the manner described the diameter of the seat $v$ in the valve will have been ascertained and the carriage 44 in the cutter-head will have been adjusted in the manner described to bring the cutting-tool 55 in proper position relative to the inner edge of the valve-seat when the parts shall have been mounted in operative position on the bed $b$. The screws 14 and the plate $b$ will now be manipulated to adjust the face of the cutter-head relative to the seat of the valve, whereupon the base-plate $b$ will be firmly clamped to the valve-body and the legs 25 will be thrust down into the bottom of the valve-body to support the cutter-head, which by the rotation of the crank-arm 20 will then be actuated and the face of the valve-seat dressed off, the cutting-tool being at the inner edge thereof and being fed radially outward relative to the head during its rotation will face off the seat the same as though the latter were mounted in a lathe. The plate $w$ and all of the mechanism associated therewith will now be removed and transferred to the frame shown in Fig. 2, the base-plate $b$ remaining on the valve-body, in which the plug or gate $g$ will have been mounted in inverted position, as shown therein, and in placing the plate $w$ on the bed $e$ of this frame it will be so disposed thereon as to locate the cutter-head adjacent that face of the plug which will when the plug is in the valve bear on the seat just faced off. When the plate $w$ is placed in position to face off the side of the plug, the adjustment of the arm 15 is in no wise changed, and the position of the cutter-head relative to the face of the plug will be determined in a general way by the engagement of the rib $y$ with one of the grooves in the bed $e$, made to receive it. Obviously the plate 3 may be moved by the screw 5, as desired, to adjust the cutting-tool toward and from the face of the plug, the latter and the cutter-head being adjusted in parallel relations in the same manner as in the case of the valve-seat—that is to say, this position of parallelism may be determined in the same way by means of the indicator-arm 72; but in effecting the necessary adjustments of the plug relative to the face of the cutter-head the latter must remain immovable and the plug be adjusted relative to the head. This may be effected as desired by adjustments provided on the swiveled plate $i$ and the clamping devices in which the plug $d$ is supported. Having been so adjusted, the legs 25 are then forced down to support the cutter-head and the face of the plug turned off in the same manner as the seat was turned off. After the valve-plug has been adjusted to have one of its faces finished it must not thereafter be moved; but after the dressing of one side thereof the bed-plate $w$ and the mechanism carried thereon will be removed from the frame in which the valve-plug is supported and will be replaced on the base-plate $b$ on the valve in a reversed position from that shown in Fig. 1 and the other seat then dressed off, after which the bed-plate $w$ will be removed again to the frame in which the valve-plug is supported, and without changing the adjustment of the cutter-head or of the valve-plug, except by the screw 5, the remaining face of the latter will be dressed off. It is quite clear that by this method the angles of the plug and the valve-seat will agree and their contiguous faces will be parallel.

Having thus described my invention, what I claim, and desire to secure by Letters Patent of the United States, is—

1. In a valve-reseating machine, a valve-facing mechanism comprising a portable base-plate interchangeable from one to the other of separate supports respectively for a valve and its seat, an adjustable arm carried by the base-plate, a facing-cutter carried by the arm and arranged to maintain a fixed cutting-plane relatively thereto, and means for securing the arm fixed in its angularly-adjusted position relative to the base, whereby the facing mechanism may be used interchangeably to face off the valve and its seat.

2. In a valve-reseating machine, a bed-plate, a slide on said plate, cutting mechanism carried by said slide and comprising a rotatable head, a tool-carriage thereon, means to feed the tool-carriage radially of the head during the rotation of the latter, and means to rotate the head, together with devices to secure said head for rotation in a plane angularly adjustable relative to its base, whereby it may be used interchangeably to face off a valve-seat or a gate.

3. In a valve-reseating machine, a base-plate, an angularly-adjustable arm carried by the base-plate and adapted to be fixed in its adjusted position, a rotatable head supported on the arm, a tool-carriage on the head, feeding devices actuated by the rotation of said head to feed the carriage radially thereof, and a cutter carried by the carriage.

4. In a valve-reseating mechanism, a rotatable head, a tool-carriage, a tool-carriage support adjustable radially of the head, said tool-carriage being slidable in its support; a feeding device for the tool-carriage, and means to operate the feeding device by the rotation of said head.

5. In a valve-reseating mechanism, a rotatable head, a tool-carriage, a tool-carriage support adjustable radially of the head, said tool-carriage being slidable in its support; a feeding device to move the tool-carriage in one direction, and means to permit its movement in the opposite direction independently of the feeding mechanism, and actuating means for the feeding devices, connected with the rotatable head.

6. In a valve-reseating mechanism, a rotatable head, a tool-carriage, a tool-carriage support adjustable radially of the head, said tool-carriage being slidable in its support, a feed-screw on the tool-carriage support and engaging the tool-carriage to move the latter in one direction, a pawl on the tool-carriage yieldingly held against the feed-screw and capable of being disengaged therefrom to permit said carriage to be moved in a direction contrary to the feed movements, together with actuating means for the feed-screw connected with said rotatable head.

7. In a valve-reseating mechanism, a rotatable member and a plate or the like constituting a support for said member, a tool-carriage, a support for the latter consisting of a plate slidable transversely of said rotatable member; a feed-screw on said plate located one side of the axis of said member and movable with said plate, a spiral pinion rotatably supported on said member, and a spiral thread on said support concentrically disposed about the axis of said member and in mesh with said pinion, said feed-screw having a sliding movement axially through the pinion and having a rotatable engagement therewith.

8. In a valve-reseating mechanism, a rotatable cutter-head, a tool-carriage thereon, means to feed the carriage radially of the head by the rotation of the latter, an arm on which said head is supported, trunnions on said arm, a plate having bearings for said trunnions, devices to swing said arm in a vertical plane, and means to adjust said plate in a horizontal plane, together with mechanism on said arm to rotate said cutter-head.

9. In a valve-reseating mechanism, a rotatable cutter-head, a tool-carriage thereon, means to feed the carriage radially of the head by the rotation of the latter, an arm on which said head is supported, and means to swing said arm in a vertical plane; an indicator-arm, a movable finger extending beyond the face o the cutter-head to bear on the work, and connections between said finger and said arm extending through the axis of the cutter-head, whereby movement may be imparted to the indicator-arm by the rotation of the cutter-head for the purpose described.

10. In a valve-reseating mechanism, means to support the plug or gate of the valve in a vertical plane, the base-plate located above the valve-plug in a horizontal plane, valve-reseating mechanism supported on said base-plate and movable toward and from the face of the plug, means to adjust the support of the valve-plug on the vertical axis of the latter, together with means on said support to adjust the plug laterally, in a plane parallel with the face of the cutter-head.

11. Valve-reseating mechanism comprising an endwise-adjustable slide, a plate extending vertically through a perforation in said slide and provided with trunnions, bearings on the slide for the trunnions, an arm secured to said plate and vertically adjustable thereon, a rotatable cutter-head secured to said arm near one end thereof, means to swing said arm in a vertical plane and to secure it in an adjusted position; a support for the lower end of the arm comprising an endwise-movable leg or strut, a crank having a pulley thereon located at the upper end of the arm, another pulley connected with the axis of the cutter-head, and a flexible connection extending over said pulleys.

12. In a valve-reseating machine, a support having a mechanism base above the face to be trued and also provided with means for adjusting a valve-plug on the axis thereof and also separate means to adjust the plug on an axis at right angles to said first-named axis and parallel with the faces of the plug, valve-facing mechanism carried by the mechanism base, and means for adjusting said facing mechanism to a truing position and for holding it in such position.

THOMAS B. WILLIAMS.

Witnesses:
WM. H. CHAPIN,
K. I. CLEMONS.